Nov. 3, 1925. 1,560,263
W. C. LEDER ET AL
FEEDING AND WATERING TROUGH
Filed Oct. 6, 1924
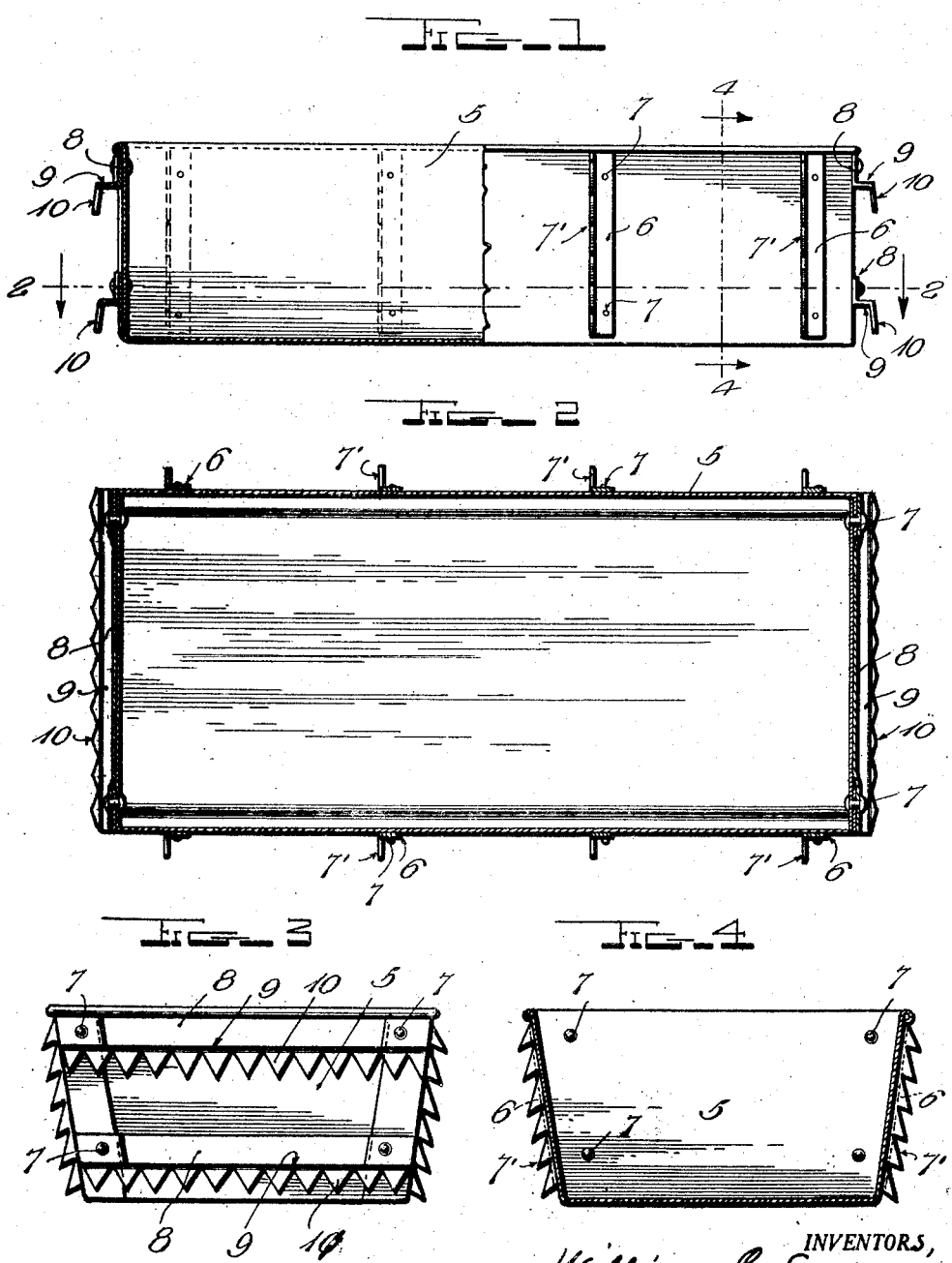

Patented Nov. 3, 1925.

1,560,263

UNITED STATES PATENT OFFICE.

WILLIAM C. LEDER AND JENS P. CHRISTENSEN, OF ST. PAUL, NEBRASKA.

FEEDING AND WATERING TROUGH.

Application filed October 6, 1924. Serial No. 742,008.

*To all whom it may concern:*

Be it known that we, WILLIAM C. LEDER and JENS P. CHRISTENSEN, citizens of the United States of America, and residents of St. Paul, in the county of Howard and State of Nebraska, have invented certain new and useful Improvements in Feeding and Watering Troughs, of which the following is a specification.

This invention relates to watering and feeding troughs, and the invention is of particular utility in connection with troughs used for watering and feeding hogs.

It is an object of this invention to produce a trough of the character indicated provided with guards which will prevent the hogs from pressing against the sides or ends of the trough; and furthermore to prevent the hogs from rooting under the trough to displace the trough or tilt it.

It is a further object of this invention to produce a trough having penetrating projections at the sides and ends which will serve to restrain undue activity of the hogs in seeking the contents of the trough.

It is a still further object of this invention to produce an attachment for troughs of the character indicated which will prove comparatively inexpensive, efficient and durable.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation partly in section of a trough embodying the invention;

Figure 2 illustrates a top plan view of a trough embodying the invention;

Figure 3 illustrates a view in elevation of the end; and

Figure 4 illustrates a sectional view on the line 4—4 of Fig. 1.

In these drawings, 5 denotes a trough which may be of any appropriate shape or configuration, and it is here shown as rectangular in plan. The guards for the trough may be modified to suit particular requirements, but in the illustrated embodiment thereof the sides of the trough are provided externally with vertically disposed plates 6 which may be secured to the trough in any appropriate manner, as by solder or fastenings similar to the fastenings 7 which are in the nature of rivets.

Each plate 6 has a serrated flange 7' which stands at an angle to the plate and each projects outwardly from the side of the trough, in position to stick into the hog, should he attempt to climb into the trough or become too active in his endeavors to reach the contents of the trough.

As shown in Figs. 1, 3 and 4, the flanges extend to the bottoms of the trough so that should the hog attempt to root under the trough, he would encounter the pointed ends of the serrations and be hurt to an extent that he would cease rooting under the trough.

The ends of the trough, in the present embodiment of the invention, have horizontally disposed strips 8 secured to them and these strips have outwardly extending flanges 9 and downwardly extending spurs 10 integral therewith, which will also serve to stick the hog, should he attempt to root under the trough or force himself against it in an attempt to displace the trough, or become unruly in his endeavors to reach the contents of the trough.

The plates 6 may be increased or diminished in number and they may be set close together or further apart, according to the requirements, and the inventors do not wish to be limited with respect to their number or their location.

Under certain conditions, horizontally disposed strips such as 8 might be employed on the sides of the trough, but those are changes in details which can be made by the manufacturer or user, according to the requirements.

We claim:

1. In a feeding and watering trough, a trough having a flat bottom and substantially vertical side and end walls, guards secured to the outer surfaces of the walls, said guards each comprising a base plate secured to the outer surface of a wall, and an angularly disposed flange having serrations.

2. In a feeding and watering trough, a trough having a flat bottom and substantially vertically disposed side and end walls, a plurality of guards for the trough having bases adapted to be secured to the walls of the trough, approximately horizontally disposed portions integral with the bases, and substantially vertically disposed flanges integral with the horizontally disposed flanges, the said approximately vertically disposed flanges having serrations the pointed edges of which extend downwardly.

WILLIAM C. LEDER.
JENS P. CHRISTENSEN.